United States Patent
Plaster

(10) Patent No.: US 8,131,429 B2
(45) Date of Patent: *Mar. 6, 2012

(54) DRIVER OBSERVATION AND SECURITY SYSTEM AND METHOD THEREFOR

(76) Inventor: Morgan Plaster, Las Vegas, NV (US)

( * ) Notice: Subject to any disclaimer, the term of this patent is extended or adjusted under 35 U.S.C. 154(b) by 432 days.

This patent is subject to a terminal disclaimer.

(21) Appl. No.: 12/364,249

(22) Filed: Feb. 2, 2009

(65) Prior Publication Data

US 2010/0198463 A1 Aug. 5, 2010

(51) Int. Cl.
*B60R 22/00* (2006.01)
(52) U.S. Cl. .......................................................... 701/45
(58) Field of Classification Search .................... 701/45; 180/271, 274, 287
See application file for complete search history.

(56) References Cited

U.S. PATENT DOCUMENTS

| | | | |
|---|---|---|---|
| 5,334,969 A | 8/1994 | Abe et al. | |
| 6,147,598 A | 11/2000 | Murphy et al. | |
| 6,313,791 B1 | 11/2001 | Klanke | |
| 6,741,165 B1 * | 5/2004 | Langfahl et al. | 340/426.1 |
| 7,380,951 B2 | 6/2008 | Plaster | |
| 2008/0106393 A1 * | 5/2008 | Bedell et al. | 340/438 |
| 2008/0120392 A1 * | 5/2008 | Dillon | 709/208 |
| 2008/0129548 A1 * | 6/2008 | Firestone | 340/993 |
| 2008/0291522 A1 * | 11/2008 | Varaprasad et al. | 359/267 |
| 2009/0273673 A1 * | 11/2009 | Worley et al. | 348/148 |

FOREIGN PATENT DOCUMENTS

CN 1962315 A * 5/2007

* cited by examiner

*Primary Examiner* — Faye M. Fleming
(74) *Attorney, Agent, or Firm* — Weiss & Moy, P.C.; Jeffrey D. Moy

(57) ABSTRACT

A driver observation and security system has a plurality of sensors located on a vehicle. The sensors will indicate unauthorized entry into the vehicle. A plurality of interior camera modules is mounted in an interior of a vehicle. The interior camera modules provide real time images of the interior of the vehicle when at least one of the plurality of sensors indicates unauthorized entry into the vehicle. A control mechanism is coupled to the plurality of interior camera modules to control operation of each of the plurality of interior camera modules. A recording device is coupled to the control mechanism for storing the real time video images. A transmitter is coupled to the control mechanism for transmitting the real time video images for viewing at a remote location.

20 Claims, 5 Drawing Sheets

DRIVER OBSERVATION AND SECURITY SYSTEM AND METHOD THEREFOR

RELATED APPLICATIONS

The present application is related to U.S. Pat. No. 7,380,951, issued on Jun. 3, 2008, in the name of the same inventor, and entitled, "DRIVER OBSERVATION SYSTEM AND METHOD THEREFOR"; and U.S. patent application having Ser. No. 12/186,419, filed Aug. 5, 2008, entitled, "DRIVER OBSERVATION SYSTEM AND METHOD THEREFOR", in the name of the same inventor, both are hereby incorporated herewith.

FIELD OF THE INVENTION

The present invention relates to automobiles, recreational vehicles (RVs) and the like, and more specifically, to a system for enhancing the observation of a driver of a vehicle by extending the driver's point of vision to the corners of the vehicle by transmitting forward, side, and rear images from the corners of the vehicle to a location within the vision of the driver at the controls of the vehicle while also providing security against thief and vandalism to the vehicle.

BACKGROUND OF THE INVENTION

With the ever increasing number of vehicles on the roads, streets and highways and the increasing number of larger vehicles, such as pick-up trucks, vans and sports utility vehicles, commonly known as SUVs, the ability of the driver of a vehicle, especially smaller vehicles such as sports cars and sedans, to see traffic conditions, whether on the side, in the rear or forward has been diminished. This is particularly so in those conditions where a driver is attempting to turn into an intersecting street, or back out of a parking spot, or trying to turn left from a turning lane across oncoming traffic. In all those instances the driver must extend the vehicle into traffic a sufficient length, usually almost half the length of the vehicle, so that the driver's line of vision covers the oncoming traffic. While most vehicles are equipped with rear view mirrors and there have been attempts to eliminate the "blind spot" behind the driver, the need to extend the driver's line of vision applies in all direction.

Likewise, because so many vehicles are already in use, there is a need to provide an enhancement or extension of the driver's line of vision to existing vehicles as well as those under manufacture. Such an enhancement would have broader application and use if it were relatively small and unobtrusive.

Therefore, a need exists to provide a device and method to overcome the above problem. The device and method needs to increase the line of vision of the driver to extended to the corners of the vehicle. The device and method further needs to provide security against thief and vandalism to the vehicle.

SUMMARY

In accordance with one embodiment, a driver observation and security system is disclosed. The driver observation and security system has a plurality of sensors located on a vehicle. The sensors will indicate unauthorized entry into the vehicle. A plurality of interior camera modules is mounted in an interior of a vehicle. The interior camera modules provide real time images of the interior of the vehicle when at least one of the plurality of sensors indicates unauthorized entry into the vehicle. A control mechanism is coupled to the plurality of interior camera modules to control operation of each of the plurality of interior camera modules. A recording device is coupled to the control mechanism for storing the real time video images. A transmitter is coupled to the control mechanism for transmitting the real time video images for viewing at a remote location.

In accordance with another embodiment of the present invention, a driver observation system and security system is disclosed. The driver observation system and security system has a plurality of sensors located on a vehicle, the sensors indicating unauthorized entry into the vehicle. A plurality of proximity sensors is located around an external perimeter of the vehicle. A plurality of interior camera modules is mounted in an interior of a vehicle. The interior camera modules provide real time images of the interior of the vehicle when at least one of the plurality of sensors indicates unauthorized entry into the vehicle. A plurality of external camera modules is mounted to an exterior area of a vehicle for providing real time video images on an exterior area of the vehicle. The exterior camera modules provide real time images of the area around the exterior of the vehicle when at least one of the proximity sensors is tripped. A control mechanism is coupled to the plurality of internal and external camera modules to control operation of each of the plurality of internal and external camera modules and to activate and deactivate the plurality of internal and external camera modules. A recording device is coupled to the control mechanism for storing the real time video images captured by the internal and external camera module. A transmitter is coupled to the control mechanism for transmitting the real time video images for viewing at a remote location.

The features, functions, and advantages can be achieved independently in various embodiments of the disclosure or may be combined in yet other embodiments.

BRIEF DESCRIPTION OF THE DRAWINGS

Embodiments of the disclosure will become more fully understood from the detailed description and the accompanying drawings, wherein.

DETAILED DESCRIPTION

Referring to the Figures, a driver observation system 10 is shown. The driver observation system 10 will provide an enhancement or extension of the driver's line of vision to existing vehicles as well as those under manufacture. The driver observation system 10 will increase the line of vision of the driver to extend to all corners of a vehicle. The driver observation system 10 will also serve as a security system for vehicle 22.

As shown in FIGS. 1-4, the driver observation system 10 has a plurality of camera modules 12. Each camera module 12 is mounted to the vehicle 22. In accordance with one embodiment, the vehicle 22 will have a plurality of external camera modules 12A which are mounted to an exterior surface of the vehicle 22 and at least one interior camera module 12B which is mounted to an interior area of the vehicle 22.

As shown in the Figures, the exterior camera modules 12A are generally mounted in the front and/or rear bumper of the vehicle 22. Preferably, the camera modules 12 are mounted on all four corners of the vehicle 22. For a more aerodynamic look, each camera module 12 is generally mounted inside the bumper of the vehicle 22 with the front face of the camera module 12 flush with the bumper. The above is given as an example. The camera module 12 may be mounted to other components and areas of the vehicle 22 without departing from the spirit and scope of the present invention. For example, the exterior camera modules 12A could be integrated into the existing headlight construction of the vehicle 22.

Figure 5:
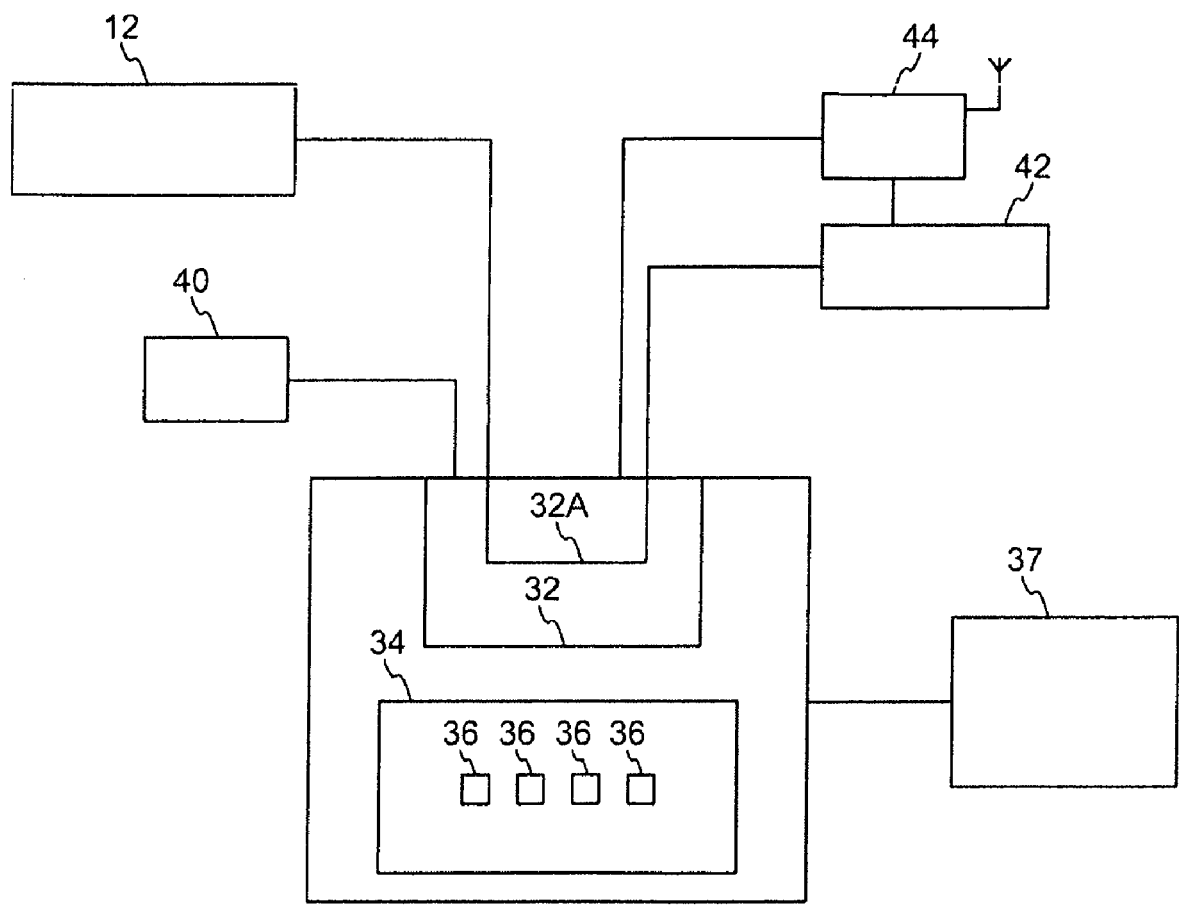
FIG. 5 is a simplified functional block diagram showing the driver observation system of the present invention.

As stated above, at least one camera module 12 is mounted to an interior of the vehicle 22. The interior camera module 12A is generally mounted in a front interior section of the vehicle 22 and will be focused on the passenger area of the vehicle 22. As shown in FIG. 5, in accordance with one embodiment, the interior camera module 12B is mounted in the dashboard 44 of the vehicle 22.

Each camera module 12 will provide a real time video stream of an area in the direction of where the camera module 12 is pointed. By mounting multiple camera modules 12 around the exterior of the vehicle 22, one will increase the line of vision of the driver to extend to different areas of the vehicle 22. Also, the interior camera module 12B allows one to record real time video stream of those in the passenger compartment of the vehicle 22. This data may be used as a safety feature which will be discussed below.

Figure 1:
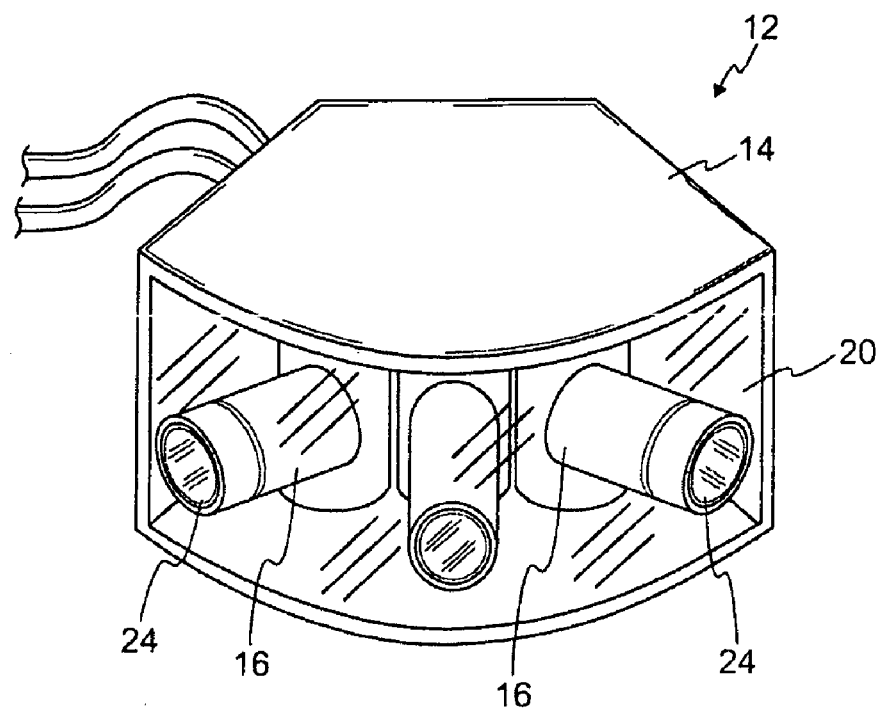
FIG. 1 is an elevated perspective view of one embodiment of the camera module used in the present invention.
Figure 2:
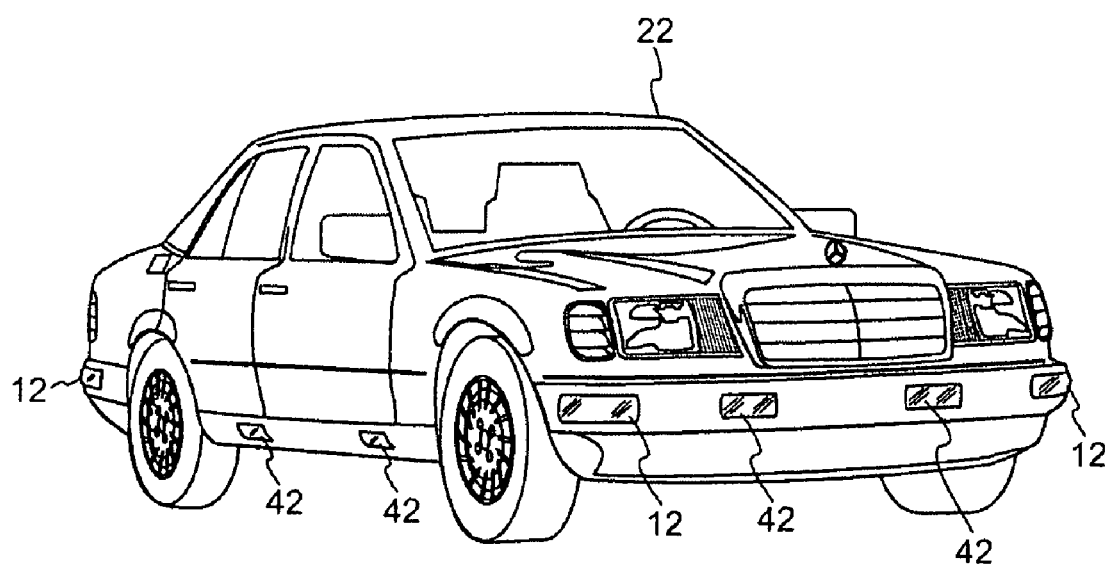
FIG. 2 is front perspective view of a vehicle showing the locations of the camera modules mounted thereon.
Figure 3:
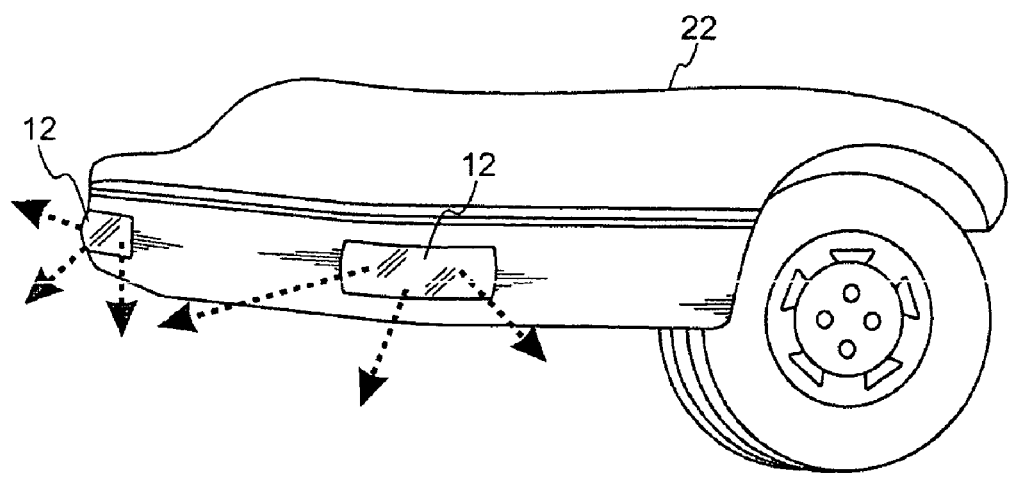
FIG. 3 is a magnified front view of the camera system used in the present invention mounted on the vehicle.
Figure 4:
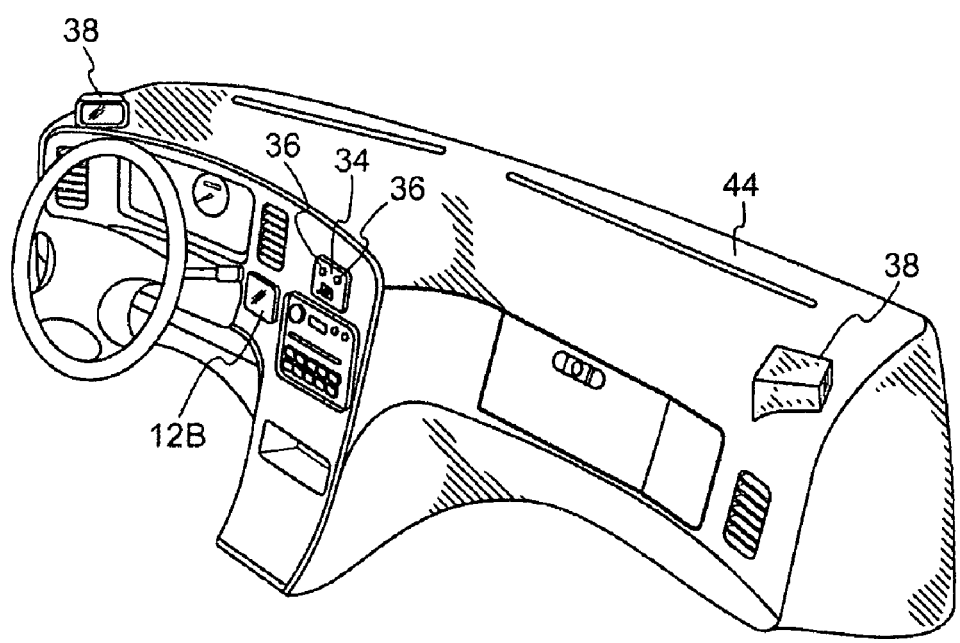
FIG. 4 is an elevated perspective view of the dashboard of the vehicle having a camera module and a monitoring and control system used in the present invention.

As shown in FIG. 1 each camera module 12, both exterior camera modules 12A and interior camera module 12B, has a housing 14, a plurality of monitoring cameras 16, and a lens panel 20. The housing 14 is generally made of a lightweight but sturdy material such as plastic, aluminum or the like. The listing of the above is given as an example and should not be seen as to limit the scope of the present invention. The housing 14 is used to protect the components in the camera module 12 from damage. The housing 14 shown in the FIG. 1 is slightly conical in shape. However, the housing 14 may come in different shapes without departing from the spirit and scope of the present invention.

As stated above, in FIG. 1, the housing 14 is slightly conical in shape. The housing 14 has a rounded front section. The side walls 14A tapers down as the side walls moves towards the rear of the housing 14. The tapered shape of the housing 14 serves two purposes. First, the rounded front end allows the monitoring cameras 16 to have a wider viewing angle. This will allow the camera modules 12 to have a larger viewing area. The tapered housing 14 further allows one to more easily install the driver observation system 10 in an existing vehicle 22. The tapered rear section of the housing 14 will allow the housing 14 to more easily be positioned inside an existing bumper of a vehicle 22, dashboard, or other exterior/ interior area of the vehicle 22.

The rounded front section of the housing 14 is covered by a lens panel 20. The lens panel 20 encloses the housing 14 to prevent damage to the components in the camera module 12. The lens panel 20 further reduces the glare from the sun and other light sources. The lens panel 20 may have a tint, coating, or the like to reduce the glare from different light sources.

Located inside each housing 14 is a plurality of monitoring cameras 16. The monitoring cameras 16 will provide real time video stream of an area where the monitoring camera 16 is pointed. Any type of monitoring camera may be used. In accordance with one embodiment, a fiber optic camera is used as these types of cameras require less space and are easier to conceal. The monitoring camera 16 may have an adjustable lens 24 mounted thereon. The adjustable lens 24 will allow one to magnify or de-magnify (i.e., zoom in or zoom out) to get a clearer image of an area. Alternatively, a wide angle lens may be placed on the monitoring camera 16. A wide angle lens will generate a larger viewing area. Thus, a larger area can be monitored using a wide angle lens.

Each monitoring camera 16 is mounted inside the housing 14. Each monitoring camera 16 is stationary and does not move. Each monitoring camera 16 is mounted so that the combination of monitoring cameras 16 in a respective camera module 12 will provide a continuous field of view for the entire viewing area of the respective camera module 12. Thus, the field of view from each monitoring camera 16 will slight overlap to provide a continuous view with no missing gaps. Also, by providing a continuous view, when the picture from a first monitoring camera 16 is switched to an adjacent monitoring camera 16, it will look like as if a single monitoring camera 16 is panning over This will be described further below.

Each camera module 12 is coupled to a control mechanism 30. The control mechanism 30 has several purposes. First, the control mechanism 30 allows one to adjust the focus and magnification of each monitoring camera 16. Second, the control mechanism 30 will allow a person to select the number of active monitoring cameras 16 and to switch between different monitoring camera(s) 16 in each camera module 12. Third, the control mechanism will allow one to switch between different camera modules 12. Thus, a driver can select one or more monitoring cameras 16 to be active in each camera module 12, switch between the different monitoring cameras 16 in each camera module 12 as well as switch to a different camera module 12 (i.e., change from the camera module 12 in the front of the vehicle 22 to one in the rear of the vehicle based on the direction the vehicle 22 is traveling). The above listing is given as an example. The control mechanism 30 may perform other features without departing from the spirit and scope of the present invention.

Figure 6:
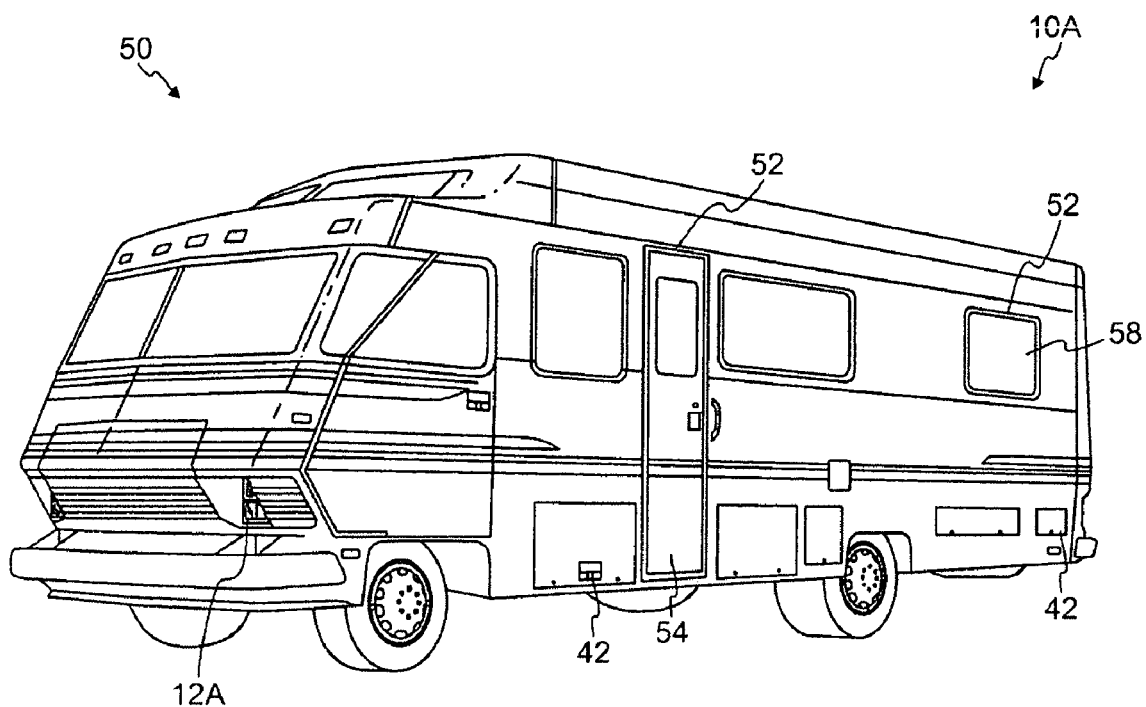
FIG. 6 is a perspective view of a Recreational Vehicle (RV) encompassing the driver observation system of the present invention.

As shown in FIGS. 5 and 6, the control mechanism 30 is comprised of a control circuit 32 and a control panel 34. The control panel 34 is generally mounted in the vehicle 22. As shown in FIG. 5, the control panel 34 has a plurality of input devices 36. The input devices 36 will allow one to control the operation of each camera module 12 and the monitoring cameras 16 in each camera module 12. The input devices 36 will generally be buttons, switches, toggles switches, and the like. The listing of the above is given as examples and should not be seen as to limit the scope of the present invention. The input devices 36 allow one to select the number of monitoring cameras 16 to be active in each camera module 12, switch between different camera modules 12, adjust the focus and/or magnification of the active monitoring camera(s) 16 in each camera module 12, and will allow a person to switch between different monitoring cameras 16 in each camera module 12. The above listing is given as an example. The control mechanism 30 may perform other features without departing from the spirit and scope of the present invention.

The input devices 36 are coupled to the control circuit 32. The control circuit 32 is generally comprised of a processor 32A. The processor 32A is programmed to allow one to adjust the position and focus of each monitoring camera 16 and will allow a person to switch between different monitoring cameras 16 through the use of the input devices 36. The processor 32A further edits the video stream from the different monitoring cameras 16. As stated above, a user may select to have all of the monitoring cameras 16 in a camera module 12 active. Thus, the processor 32A will merge the video stream from each of the active monitoring cameras 16 and form a single video stream that provides a continuous field of view for the entire viewing area of the respective camera module 12. If the user only selects one monitoring camera 16, since the video stream from each monitoring camera 16 will slight overlap, when the video stream from a first monitoring camera 16 is switched to an adjacent monitoring camera 16, the processor will merger the video stream to look as if the video stream is been shifted like the monitoring camera 16 is panning over.

The real time video stream and/or modified video stream by the processor 32A are shown on a display system 37. The display system 37 is generally mounted inside the vehicle 22 in which the driver observation system 10 is installed. In general, the display system 37 is generally comprised of one or more video monitors 38 which are mounted on the dash 44 of the vehicle 22. A video monitor 38 is generally mounted on both the left and right side of the dashboard 44.

The control mechanism 30 may allow one to control the images on the display system 37. For example, the video monitor 38 may be split to show images from all of the camera modules 12. Alternatively, the video monitor 38 may show images from multiple or a single monitoring camera 16. The control mechanism 30 will allow the user to toggle between different monitoring cameras 16 and/or camera modules 12 which will be displayed on the video monitor 38. In accordance with another embodiment, a pair of video monitors 38 may be installed in the vehicle 22. The video monitors 38 will generally be mounted on each side of the dashboard of the vehicle 22. In general, the video monitor 38 on the right side will display images from the front and back of the vehicle 22 on the passenger's side, while video monitor 38 on the left side will display images from the front and back of the vehicle 22 on the driver's side. As discussed above, the video monitors 38 may be split to show images from all of the monitoring cameras 16 and/or camera modules 12. Alternatively, the video monitor 38 may just show images from individual or multiple monitoring cameras 16. The control mechanism 30 will then allow the user to toggle between different monitoring cameras 16 which will be displayed on the video monitor 38.

A recording device 40 may be coupled to the processor 32A. The recording device 40 is used to store the video stream from the monitoring cameras 16 of the different camera modules 12. The recoding device 40 may be programmed to record the video stream from all the camera modules 12, only the active camera modules 12, the video stream that is displayed on the video monitor 38, and the like. The recording device 40 may further be used to record the video stream from the interior camera module 12B. This data may be used as evidence. For example, the recorded video stream may be used to show that the driver was handling the vehicle 22 in a proper manner during an accident, was driving in a proper manner if the vehicle 22 is a company vehicle, and the like. The above listing of the above video stream to be recorded and uses of the recorded video stream data is given as an example and should not be seen as to limit the scope of the present invention. In general, the control mechanism 30 may be used to program the recording device 40 as to which video stream is to be recorded.

The driver observation system 10 may further have proximity sensors 42 located on the vehicle 22. The proximity sensors 42 are used to monitor a perimeter around the vehicle 22. When the vehicle 22 is turned off, the proximity sensors 42 will activate. If a person comes within a predetermined distance of the vehicle 22, the proximity sensor 42 will send a signal to the processor 32A to active the camera module 12 closest to the proximity sensor 42 that was triggered. The interior camera module 12A may also be activated. The monitoring cameras 16 in the activated camera module 12 will send a video stream which will be recorded by the recording device 40. The recorded video stream may be used as evidence. For example, the recorded video stream may be used to identify individuals who may have vandalize the vehicle 22, stolen the vehicle 22, and the like.

A transmitter 44 may be coupled to the recording device 44 and the control circuit 30. The transmitter 42 will compress and transmit the video stream being recorded to a device such as a cellular phone, computer, laptop, personal digital assistant, and the like. Alternatively, the transmitter 42 will compress and transmit the video stream being recorded to a third party monitoring company. The control circuit 30 may be used to program when the transmitter 44 transmits video stream data.

For example, the transmitter 42 may be activated when the proximity sensor 42 sends the signal to the processor 32A to active the camera module 12 closest to the proximity sensor 42 that has been tripped. An individual may receive the video stream in real time, such as on a cellular phone, to monitor the vehicle 22 to make sure no one is trying to steal/damage his vehicle 22. Alternatively, a parent may have video stream data from the interior camera module 12B sent to the parent's cellular phone/computer so that the parent may monitor a child's driving abilities. The listing of the above is only given as examples, and should not be seen as to limit the scope of the present invention. The transmitter 44 may transmit video stream data for many other reasons other than those described above.

The observation system 10 may further have a GPS unit 46. The GPS unit 46 may be coupled to the transmitter 42 or another transmitting antenna. The GPS unit 46 would further aid in vehicle recovery, accident reporting, and navigation.

Referring now to FIGS. 1 and 5-7, another embodiment of the present invention is shown. In this embodiment, the observation system 10A is installed in a recreational vehicle (RV) 50.

In the present embodiment, the observation system 10A may still have a plurality of camera modules 12. Each camera module 12 is mounted to the RV 50. In accordance with one embodiment, the RV 50 may have a plurality of external camera modules 12A which are mounted to an exterior surface of the vehicle 22 and/or at least one interior camera module 12B which is mounted to an interior area 51 of the RV 50.

As in the previous embodiment, the exterior camera modules 12A are generally mounted in the front and/or rear bumper of the RV 50. Each exterior camera module 12A is generally mounted inside the bumper of the RV 50 with the front face of the exterior camera module 12A flush with the bumper. The above is given as an example. The exterior camera module 12A may be mounted to other components and areas of the RV 50 without departing from the spirit and scope of the present invention. For example, the exterior camera modules 12A could be integrated into the existing headlight construction of the RV 50.

Figure 7:
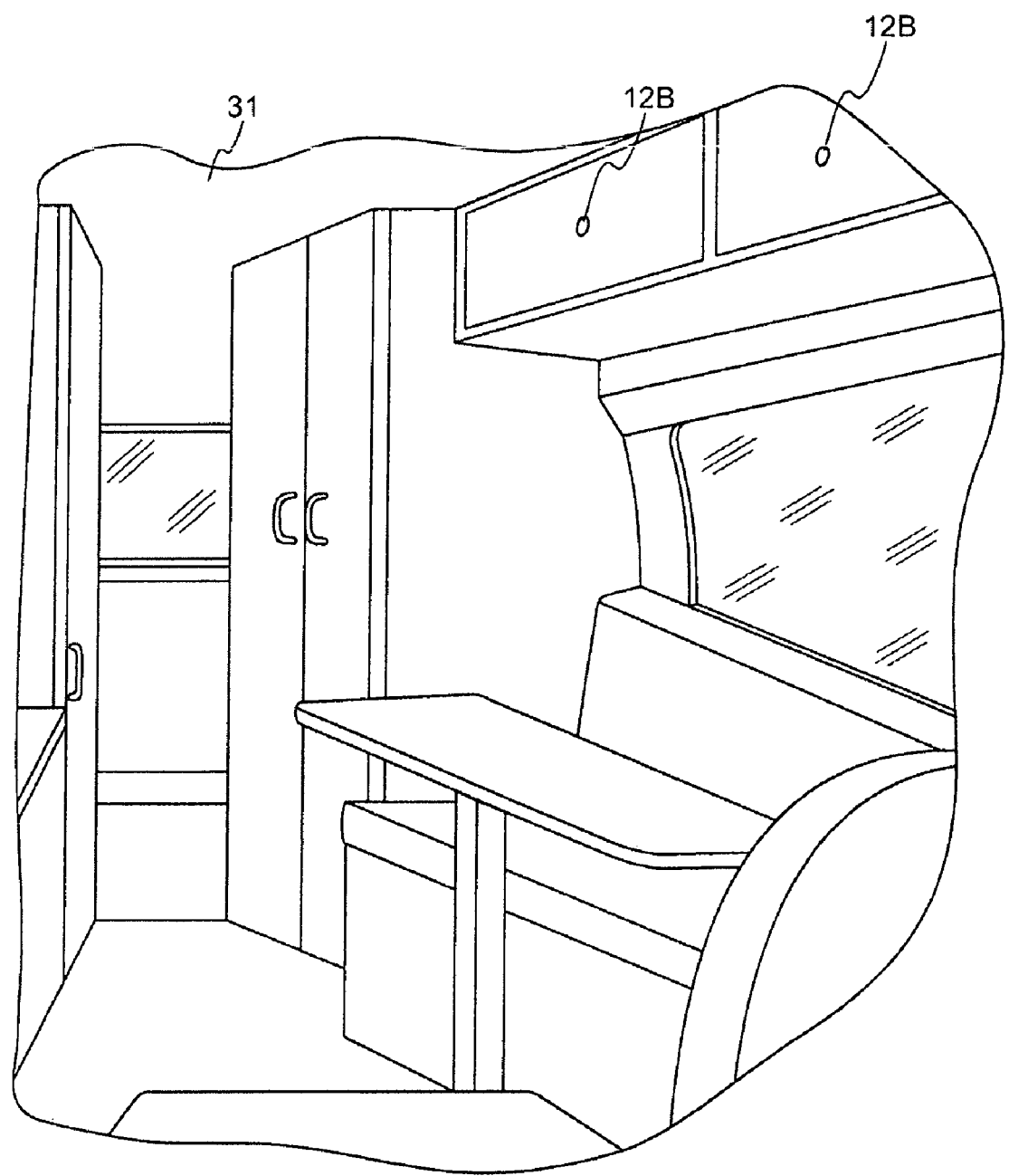
FIG. 7 is a perspective view of an interior of the RV of FIG. 6.

As stated above, at least one camera module 12 is mounted to an interior 51 of the RV 50. The interior camera module 12B is generally mounted to focus on the interior 51 of the RV 50. As shown in FIGS. 6 and 7, in accordance with one embodiment, the interior camera modules 12B are mounted in different areas of the passenger compartment of the RV 50. As in the previous embodiment, interior camera modules 12B may also be installed in the dashboard of the RV 50.

Each camera module 12 will provide a real time video stream of an area in the direction of where the camera module 12 is pointed. By mounting multiple camera modules 12 around the exterior of the RV 50, one will increase the line of vision of the driver to extend to different areas of the RV 50. Also, the interior camera module 12B allows one to record real time video stream of those in the interior 51 of the RV 50. This data may be used as a safety feature which will be discussed below.

As in the previous embodiment, each camera module 12, both exterior camera modules 12A and interior camera module 12B, has a housing 14, a plurality of monitoring cameras 16, and a lens panel 20. The housing 14 is generally made of a lightweight but sturdy material such as plastic, aluminum or the like. The housing 14 is used to protect the components in the camera module 12 from damage.

The housing 14 may be slightly conical in shape. The housing 14 has a rounded front section. The side walls 14A tapers down as the side walls moves towards the rear of the housing 14. The tapered shape of the housing 14 serves two purposes. First, the rounded front end allows the monitoring cameras 16 to have a wider viewing angle. This will allow the camera modules 12 to have a larger viewing area. The tapered housing 14 further allows one to more easily install the driver observation system 10 in an existing RV 50. The tapered rear section of the housing 14 will allow the housing 14 to more easily be positioned inside an existing bumper of an RV 50, dashboard, or other exterior/interior area of the RV 50.

The rounded front section of the housing 14 is covered by a lens panel 20. The lens panel 20 encloses the housing 14 to prevent damage to the components in the camera module 12. The lens panel 20 further reduces the glare from the sun and other light sources. The lens panel 20 may have a tint, coating, or the like to reduce the glare from different light sources.

Located inside each housing 14 is at least one monitoring camera 16. The monitoring cameras 16 will provide real time video stream of an area where the monitoring camera 16 is pointed. Any type of monitoring camera may be used. In accordance with one embodiment, a fiber optic camera is used as these types of cameras require less space and are easier to conceal. The monitoring camera 16 may have an adjustable lens 24 mounted thereon. The adjustable lens 24 will allow one to magnify or de-magnify (i.e., zoom in or zoom out) to get a clearer image of an area. Alternatively, a wide angle lens may be placed on the monitoring camera 16. A wide angle lens will generate a larger viewing area. Thus, a larger area can be monitored using a wide angle lens.

The observation system 10A further has sensor 52 located on the doors 54 and 56 of the RV 50. Sensors 52 may further be located on certain windows 58 of the RV 50. The sensors 52 will monitor if there is an unauthorized entry into the RV 50 through one of the doors 54 or the windows 58. The observation system 10 may further have motion sensors 60 located in the interior 51 of the RV 50. The motion sensors 60 may be active or passive sensor devices. The motion sensors 60 will detect the movement of unauthorized individuals in the RV 50. In accordance with one embodiment, the motion sensors 60 are passive infrared sensors. These types of sensors will lower power consumption of the observation system 10A.

If one of the sensors 52 or motion sensors 60 detects unauthorized entry into the RV 50, the sensors 52 or motion sensors 60 that detects the unauthorized entry will send a signal to the interior camera module 12A closest to the sensor 52 or motion sensor 60 that detects the unauthorized entry. The interior camera module 12A will begin to record and send the recorded data to the control mechanism 30.

Each camera module 12 is coupled to a control mechanism 30. As shown in FIGS. 5 and 6, the control mechanism 30 may be comprised of a control circuit 32 and a control panel 34. The control panel 34 may generally be mounted in the RV 50. As shown in FIG. 5, the control panel 34 may have a plurality of input devices 36. The input devices 36 allow one to control the operation of each camera module 12 and the monitoring cameras 16 in each camera module 12. The input devices 36 may be buttons, switches, toggles switches, and the like. The input devices 36 allow one to select the number of monitoring cameras 16 to be active in each camera module 12, switch between different camera modules 12, adjust the focus and/or magnification of the active monitoring camera(s) 16 in each camera module 12, and will allow a person to switch between different monitoring cameras 16 in each camera module 12. The above listing is given as an example. The control mechanism 30 may perform other features without departing from the spirit and scope of the present invention.

The input devices 36 may be coupled to the control circuit 32. The control circuit 32 is generally comprised of a processor 32A. The processor 32A is programmed to allow one to adjust the position and focus of each monitoring camera 16 and will allow a person to switch between different monitoring cameras 16 through the use of the input devices 36. The processor 32A further edits the video stream from the different monitoring cameras 16. As stated above, a user may select to have all of the monitoring cameras 16 in a camera module 12 active. Thus, the processor 32A will merge the video stream from each of the active monitoring cameras 16 and form a single video stream that provides a continuous field of view for the entire viewing area of the respective camera module 12. If the user only selects one monitoring camera 16, since the video stream from each monitoring camera 16 will slight overlap, when the video stream from a first monitoring camera 16 is switched to an adjacent monitoring camera 16, the processor will merger the video stream to look as if the video stream has been shifted like the monitoring camera 16 is panning over. The processor 32A will send signals to activate a particular camera module when one of the sensors 52 or motion sensors 60 detects unauthorized entry into the RV 50.

The real time video stream and/or modified video stream by the processor 32A may be shown on a display system 37. The display system 37 is generally mounted inside the RV 50 in which the driver observation system 10 is installed. In general, the display system 37 is generally comprised of one or more video monitors 38 which are mounted on the dash 44 of the RV 50. A video monitor 38 is generally mounted on both the left and right side of the dashboard 44.

The control mechanism 30 may allow one to control the images on the display system 37. For example, the video monitor 38 may be split to show images from all of the camera modules 12. Alternatively, the video monitor 38 may show images from multiple or a single monitoring camera 16. The control mechanism 30 will allow the user to toggle between different monitoring cameras 16 and/or camera modules 12 which will be displayed on the video monitor 38. In accordance with another embodiment, a pair of video monitors 38 may be installed in the RV 50. The video monitors 38 will generally be mounted on each side of the dashboard of the RV 50. In general, the video monitor 38 on the right side will display images from the front and back of the RV 50 on the passenger's side, while video monitor 38 on the left side will display images from the front and back of the RV 50 on the driver's side. As discussed above, the video monitors 38 may be split to show images from all of the monitoring cameras 16 and/or camera modules 12. Alternatively, the video monitor 38 may just show images from individual or multiple monitoring cameras 16. The control mechanism 30 will then allow the user to toggle between different monitoring cameras 16 which will be displayed on the video monitor 38.

A recording device 40 may be coupled to the processor 32A. The recording device 40 is used to store the video stream from the monitoring cameras 16 of the different camera modules 12. The recoding device 40 may be programmed to record the video stream from all the camera modules 12, only the active camera modules 12, the video stream that is displayed on the video monitor 38, and the like. The recording device 40 may further be used to record the video stream from the interior camera module 12B. This data may be used as evidence. For example, the recorded video stream may be used to show data related to an unauthorized person entering into the RV 50, that the driver was handling the RV 50 in a proper manner during an accident, and the like. The above listing of the above video stream to be recorded and uses of the recorded video stream data is given as an example and should not be seen as to limit the scope of the present invention. In general, the control mechanism 30 may be used to program the recording device 40 as to which video stream is to be recorded.

The driver observation system 10A may further have proximity sensors 42 located on the RV 50. The proximity sensors 42 are used to monitor a perimeter around the RV 50. The proximity sensors 42 may be a photoelectric beam, motion sensors, infrared sensors, and the like. When the RV 50 is turned off, the proximity sensors 42 will activate. If a person comes within a predetermined distance of the RV 50, the proximity sensor 42 will send a signal to the processor 32A to active the camera module 12 closest to the proximity sensor 42 that was triggered. The interior camera module 12A may also be activated. The monitoring cameras 16 in the activated camera module 12 will send a video stream which will be recorded by the recording device 40. The recorded video stream may be used as evidence. For example, the recorded video stream may be used to identify individuals who may have vandalize the vehicle 22, stolen the vehicle 22, and the like.

A transmitter 44 may be coupled to the recording device 44 and the control circuit 30. The transmitter 42 will compress and transmit the video stream being recorded to a device such as a cellular phone, computer, laptop, personal digital assistant, and the like. It should be noted that to conserve power, instead of transmitting a video stream, the transmitter 44 may transmit still images that have been captured by the camera modules 12. The transmitter 42 may also compress and transmit the video stream being recorded to a third party monitoring company or to a server where the video may be viewed via a website. The control circuit 30 may be used to program when the transmitter 44 transmits video stream data. For example, the transmitter 42 may be activated when the proximity sensor 42 sends the signal to the processor 32A to active the camera module 12 closest to the proximity sensor 42 that has been tripped. An individual may receive the video stream in real time, such as on a cellular phone, to monitor the vehicle 22 to make sure no one is trying to steal/damage his vehicle 22. Alternatively, a parent may have video stream data from the interior camera module 12B sent to the parent's cellular phone/computer so that the parent may monitor a child's driving abilities. The listing of the above is only given as examples, and should not be seen as to limit the scope of the present invention. The transmitter 44 may transmit video stream data for many other reasons other than those described above.

The transmitter 44 may be a cellular transmitter, a satellite transmitter, broadband, or the like. The above listing is given as an example and should not be seen as to limit the scope of the present invention. It should be noted that a satellite transmitter may allow for broader coverage in areas where cellular transmission may be difficult due to lack of cellular towers. In accordance with one embodiment, the transmitter 44 is a transmitter/receiver. This would allow a person to use a remote device such as a cellular phone to program/control the control circuit 32. For example, a user may be able to push different buttons on his/her cellular phone to change the video stream being received to a different camera module 12.

The observation system 10 may further have a GPS unit 46. The GPS unit 46 may be coupled to the transmitter 42 or another transmitting antenna. The GPS unit 46 would further aid in vehicle recovery, accident reporting, and navigation.

While embodiments of the disclosure have been described in terms of various specific embodiments, those skilled in the art will recognize that the embodiments of the disclosure can be practiced with modifications within the spirit and scope of the claims.

What is claimed is:

1. A driver observation and security system comprising:
   a plurality of sensors located on a vehicle, the sensors indicating unauthorized entry into the vehicle;
   a plurality of interior camera modules mounted in an interior of the vehicle, wherein the interior camera modules provide real time images of the interior of the vehicle when at least one of the plurality of sensors indicates unauthorized entry into the vehicle;
   a control mechanism coupled to the plurality of interior camera modules to control operation of each of the plurality of interior camera modules;
   a recording device coupled to the control mechanism for storing the real time video images; and
   a transmitter/receiver coupled to the control mechanism for transmitting the real time video images for viewing at a remote location and for allowing one to send signals to the control mechanism to remotely control operation of each of the plurality of interior cameras.

2. A driver observation and security system in accordance with claim 1 further comprising:
   a plurality of proximity sensors located around an external perimeter of the vehicle; and
   a plurality of external camera modules mounted to an exterior area of a vehicle for providing real time video images on the external perimeter of the vehicle, the plurality of external camera modules coupled to the control mechanism, wherein the exterior camera modules provide real time images of the external perimeter of the vehicle when at least one of the proximity sensors is tripped.

3. A driver observation system in accordance with claim 1 wherein the transmitter is a wireless transmitter.

4. A driver observation system in accordance with claim 1 wherein the plurality of sensors comprises at least one of door sensors attached to doors of the vehicle or motion sensors located in the interior of the vehicle.

5. A driver observation system in accordance with claim 1 wherein the plurality of sensors further comprises window sensors.

6. A driver observation system in accordance with claim 2 further comprising:
   a display system coupled to the control mechanism to show the real time video images; and
   wherein the control mechanism is coupled to the plurality of internal and external camera modules to control operation of each of the plurality of internal and external camera modules and to switch between different internal and external camera modules for viewing.

7. A driver observation system in accordance with claim 2 wherein each external camera module comprises:
   a housing, wherein a front area of the housing has a substantially opaque cover; and
   a plurality of video cameras mounted in the housing.

8. A driver observation system in accordance with claim 4 wherein motion sensors are passive motion sensors.

9. A driver observation system in accordance with claim 2 wherein the control mechanism comprises:
   a control panel mounted in the vehicle, the control panel having a plurality of input devices; and
   a control circuit coupled to the control panel to control operation of the camera modules and the display system.

10. A driver observation system in accordance with claim 2 wherein the display system comprises at least one display monitor.

11. A driver observation system in accordance with claim 2 wherein the plurality of proximity sensors are photoelectric beams located around an external perimeter of the vehicle.

12. A driver observation system comprising:
   a plurality of sensors located on a vehicle, the sensors indicating unauthorized entry into the vehicle;
   a plurality of proximity sensors located around an external perimeter of the vehicle; and
   a plurality of interior camera modules mounted in an interior of a vehicle, wherein the interior camera modules provide real time images of the interior of the vehicle when at least one of the plurality of sensors indicates unauthorized entry into the vehicle;
   a plurality of external camera modules mounted to an exterior area of a vehicle for providing real time video images on the exterior area of the vehicle, wherein the exterior camera modules provide real time images of the exterior area around the vehicle when at least one of the proximity sensors is tripped;
   a control mechanism coupled to the plurality of internal and external camera modules to control operation of each of the plurality of internal and external camera modules and to activate and deactivate the plurality of internal and external camera modules;
   a recording device coupled to the control mechanism for storing the real time video images captured by the internal and external camera modules; and
   a transmitter/receiver coupled to the control mechanism for transmitting the real time video images for viewing at a remote location and for allowing one to send signals to the control mechanism to control operation of each of the plurality of interior cameras remotely.

13. A driver observation system in accordance with claim 11 wherein the transmitter is a wireless transmitter.

14. A driver observation system in accordance with claim 11 wherein the plurality of sensors comprises at least one of door sensors attached to doors of the vehicle or motion sensors located in the interior of the vehicle.

15. A driver observation system in accordance with claim 11 wherein the plurality of sensors further comprises window sensors.

16. A driver observation system in accordance with claim 14 wherein the motion sensors are passive motion sensors.

17. A driver observation system in accordance with claim 11 further comprising:
   a display system coupled to the control mechanism to show the real time video images; and
   wherein the control mechanism is coupled to the plurality of internal and external camera modules to control operation of each of the plurality of internal and external camera modules and to switch between different internal and external camera modules for viewing.

18. A driver observation system in accordance with claim 11 wherein the control mechanism comprises:
   a control panel mounted in the vehicle, the control panel having a plurality of input devices; and
   a control circuit coupled to the control panel to control operation of the camera modules and the display system.

19. A driver observation system comprising:
   a plurality of sensors located on a vehicle, the sensors indicating unauthorized entry into the vehicle;
   a plurality of proximity sensors located around an external perimeter of the vehicle; and
   a plurality of interior camera modules mounted in an interior of a vehicle, wherein the interior camera modules provide real time images of the interior of the vehicle when at least one of the plurality of sensors indicates unauthorized entry into the vehicle;
   a plurality of external camera modules mounted to an exterior area of a vehicle for providing real time video images on an exterior area of the vehicle, wherein the exterior camera modules provide real time images of the area around the vehicle when at least one of the proximity sensors is tripped;
   a control mechanism coupled to the plurality of internal and external camera modules to control operation of each of the plurality of internal and external camera modules and to activate and deactivate the plurality of internal and external camera modules;
   a recording device coupled to the control mechanism for storing the real time video images captured by the internal and external camera modules; and
   a wireless transmitter/receiver coupled to the control mechanism for transmitting the real time video images for viewing at a remote location and for allowing one to send signals to the control mechanism to control operation of each of the plurality of interior cameras remotely;
   wherein the plurality of sensors comprises:
      door sensors attached to doors of the vehicle; and
      motion sensors located in the interior of the vehicle;
   wherein the plurality of proximity sensors are photo electronic beams.

20. A driver observation system in accordance with claim 19 further comprising:
   a display system coupled to the control mechanism to show the real time video images; and
   wherein the control mechanism is coupled to the plurality of internal and external camera modules to control operation of each of the plurality of internal and external camera modules and to switch between different internal and external camera modules for viewing, wherein the control mechanism comprises:
      a control panel mounted in the vehicle, the control panel having a plurality of input devices; and
      a control circuit coupled to the control panel to control operation of the camera modules and the display system.

* * * * *